(12) United States Patent
Simring

(10) Patent No.: US 9,037,402 B2
(45) Date of Patent: May 19, 2015

(54) SYSTEM AND METHOD FOR PROGRAMMING AND DISPLAYING DIRECTIONALLY BASED TEXTUAL WAYFINDING CONTENT

(71) Applicant: Four Winds Interactive, LLC, Denver, CO (US)

(72) Inventor: David Shapiro Simring, Highlands Ranch, CO (US)

(73) Assignee: Four Winds Interactive, LLC, Denver, CO (US)

(*) Notice: Subject to any disclaimer, the term of this patent is extended or adjusted under 35 U.S.C. 154(b) by 0 days.

(21) Appl. No.: 13/948,451

(22) Filed: Jul. 23, 2013

(65) Prior Publication Data

US 2014/0032110 A1 Jan. 30, 2014

Related U.S. Application Data

(60) Provisional application No. 61/676,066, filed on Jul. 26, 2012.

(51) Int. Cl.
*G01C 21/36* (2006.01)
*G01C 21/34* (2006.01)
*G01C 21/32* (2006.01)

(52) U.S. Cl.
CPC ............ *G01C 21/34* (2013.01); *G01C 21/3644* (2013.01); *G01C 21/32* (2013.01); *G01C 21/3626* (2013.01)

(58) Field of Classification Search
CPC ............ G01C 21/3644; G01C 21/3626; G06F 17/30241
USPC .......................................... 701/438, 440, 533
See application file for complete search history.

(56) References Cited

U.S. PATENT DOCUMENTS

| | | | | |
|---|---|---|---|---|
| 6,477,460 | B2* | 11/2002 | Kepler | 701/426 |
| 6,510,379 | B1* | 1/2003 | Hasegawa et al. | 701/533 |
| 7,266,447 | B2* | 9/2007 | Bauer et al. | 701/423 |
| 7,373,244 | B2* | 5/2008 | Kreft | 701/532 |
| 7,421,341 | B1* | 9/2008 | Hopkins et al. | 701/533 |
| 7,652,594 | B2 | 1/2010 | Lamont et al. | |
| 7,912,637 | B2* | 3/2011 | Horvitz et al. | 701/33.4 |

(Continued)

FOREIGN PATENT DOCUMENTS

WO  2012/092667  7/2012

OTHER PUBLICATIONS

22Miles Software—Customizable Interactive Software for Touchscreen and Mobile—1-408-837-0589/877-566-6789, (Copyright 2007-2013).

*Primary Examiner* — Behrang Badii
*Assistant Examiner* — David Testardi
(74) *Attorney, Agent, or Firm* — Woodard, Emhardt, Moriarty, McNett & Henry LLP

(57) ABSTRACT

Disclosed are systems and methods related to managing and programming directional wayfinding content associated with a map. Embodiments include a system for programming directionally based textual instructions describing navigating to and from map locations along path segments between the locations. The textual instructions can then be arranged as output to a user in an order corresponding to a travel route to provide customizable textual instructions to a remote location that vary depending on the direction of the paths traversed in the route. Also disclosed are various methods and devices for delivering the textual instructions to an end user.

19 Claims, 12 Drawing Sheets

(56) References Cited

U.S. PATENT DOCUMENTS

| | | | |
|---|---|---|---|
| 8,301,641 B2* | 10/2012 | Rossio et al. | 707/749 |
| 8,364,398 B2* | 1/2013 | Rossio et al. | 701/439 |
| 8,370,060 B2* | 2/2013 | Rossio et al. | 701/439 |
| 8,510,268 B1* | 8/2013 | LaForge et al. | 707/625 |
| 8,515,674 B2* | 8/2013 | Babetski | 701/533 |
| 8,584,013 B1* | 11/2013 | Tveit | 715/700 |
| 2007/0078596 A1* | 4/2007 | Grace | 701/209 |
| 2007/0276592 A1* | 11/2007 | Johnson et al. | 701/208 |
| 2007/0299607 A1* | 12/2007 | Cubillo | 701/211 |
| 2008/0140310 A1* | 6/2008 | Graef | 701/206 |
| 2008/0163073 A1* | 7/2008 | Becker et al. | 715/753 |
| 2008/0262714 A1* | 10/2008 | Abramovich Ettinger | 701/201 |
| 2008/0262717 A1* | 10/2008 | Ettinger | 701/206 |
| 2009/0100018 A1* | 4/2009 | Roberts | 707/3 |
| 2009/0144143 A1 | 6/2009 | Iyer | |
| 2009/0306882 A1* | 12/2009 | Vijayakrishnan et al. | 701/200 |
| 2010/0030468 A1* | 2/2010 | Zou | 701/209 |
| 2011/0046881 A1* | 2/2011 | Karaoguz | 701/208 |

* cited by examiner

SYSTEM AND METHOD FOR PROGRAMMING AND DISPLAYING DIRECTIONALLY BASED TEXTUAL WAYFINDING CONTENT

CROSS REFERENCE TO RELATED APPLICATIONS

This application claims the benefit of U.S. Provisional Application No. 61/676,066 filed Jul. 26, 2012, which is hereby incorporated by reference in its entirety.

FIELD OF THE INVENTION

Aspects of the present disclosure deal with digital signage, and specifically a system and method for programming wayfinding content.

BACKGROUND

Wayfinding can involve systems and processes for directing end users from a start point to a desired end point, often involving a graphical representation on a map as well as textual directions. Typical wayfinding methodologies consist of basic path lines and location points. When an end user queries the system for the "best" route from one point to another, a standard graph-search algorithm will use the paths and location points to solve for a desired route, typically the shortest distance route. Generally, wayfinding systems provide instructions to end users using a limited set of pre-programmed commands, for example including commands such as: turn left, turn right, go straight, or compass based commands such as turn/go north, south, east or west. These commands are sometimes coupled with pre-assigned standardized path indicia such as street names.

Aspects of the present disclosure provide improvements in programming the instructional content used in wayfinding systems.

SUMMARY

Disclosed is a computer implemented content-management system and method to allow a programmer/manager to configure "wayfinding" content in a system, which refers to the display of a map and its geographic assets, including locations and paths. When the system is in use, the system can be queried by end users to show the route from one location to another, including textual instructions to describe navigation. Embodiments of the present system provide a unique syntax for specifying directional wayfinding, allowing the use of customized textual instructions that change depending on the direction of the paths traversed in the route. A non-limiting example system is specifically discussed and illustrated as adapted for use in digital signage.

Aspects of the present system enable a system manager to program wayfinding content for use in digital signage or other applications where the content may include directionally based instructions and/or an unlimited variety of instructions which may be customized to specific locations and which are not limited to a set of pre-programmed commands.

This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DETAILED DESCRIPTION OF THE ILLUSTRATED EMBODIMENTS

Figure 1:
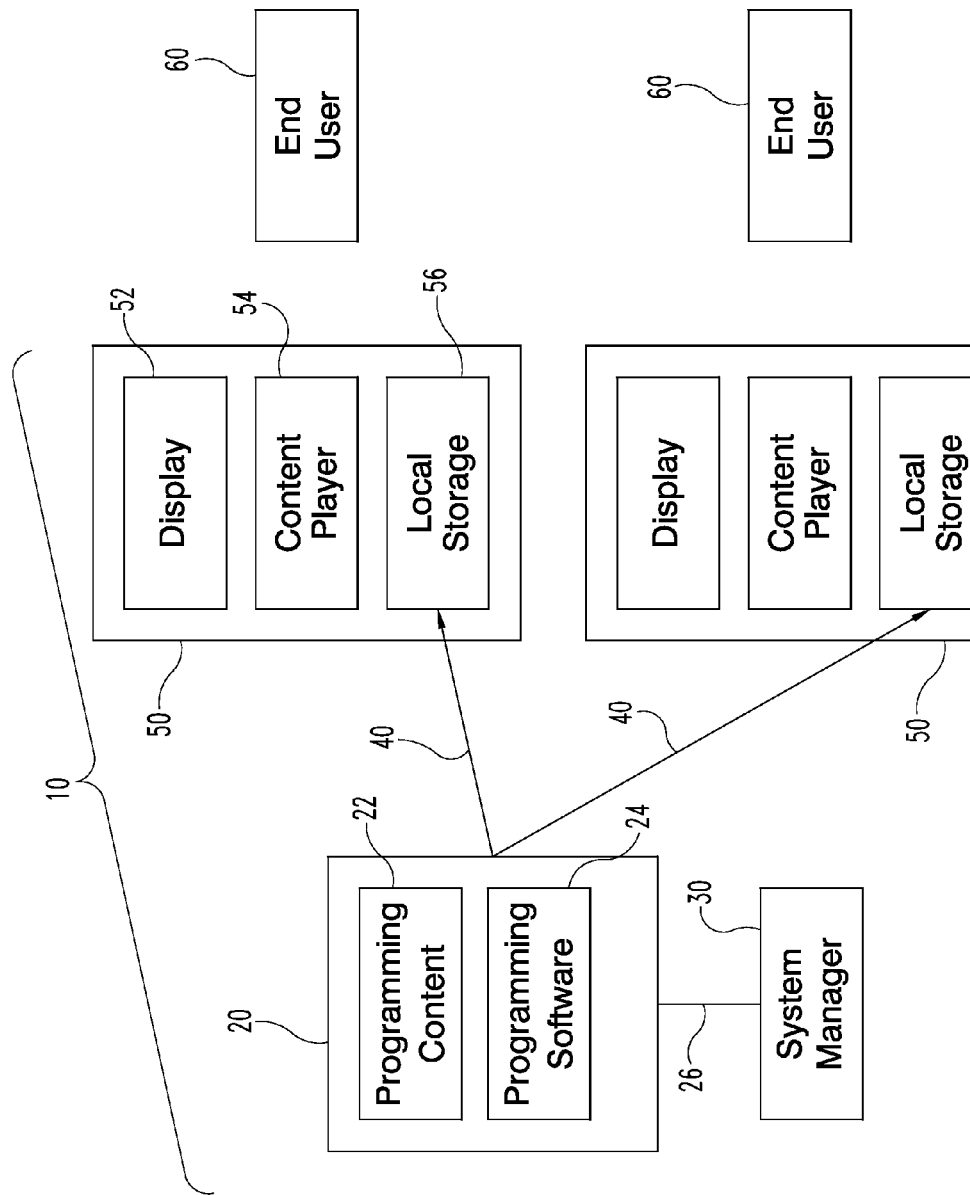
FIG. 1. illustrates an example schematic representation of one embodiment of the system.

For the purposes of promoting an understanding of the principles of the disclosure, reference will now be made to the embodiments illustrated in the drawings and specific language will be used to describe the same. It will nevertheless be understood that no limitation of the scope of the claims is thereby intended, such alterations and further modifications in the illustrated device, and such further applications of the principles of the disclosure as illustrated therein, being contemplated as would normally occur to one skilled in the art to which the disclosure relates.

Disclosed is a computer implemented content-management system and method to allow a system manager to configure directional "wayfinding" content in a system, which refers to the display of a map and its geographic assets, including locations and paths. When the system is in use, the system can be queried by end users to show the route from one location to another, including textual instructions to describe navigation. Embodiments of the present system provide a unique syntax for specifying directional wayfinding, allowing the use of customized textual instructions that change depending on the direction of the paths traversed in the route. A non-limiting example system is specifically discussed and illustrated as adapted for use in digital signage.

The term "system manager" is used broadly herein to refer to an individual or account with privileges to create, edit and manage wayfinding content, including but not limited to managers, administrators and system programmers. In contrast, an "end user" is generally an individual who uses the system to access, search and retrieve wayfinding content information, typically at or through a designated location or device. The use of these terms is not intended to be limiting.

Turning to FIG. 1, a diagrammatic view of an example system suitable for use in certain embodiments of the present invention is shown. System 10 incorporates a programming or management environment 20, including a programming content storage media 22 suitable for storing information on wayfinding content, such as a map and its geographic assets, locations and paths. The programming content storage media 22 is connected permanently or as desired via a communications link with a programming software application 24 within the programming environment 20. The software application 24 includes an application façade or user interface visible to a system manager 30 via a communications link 26.

The programming environment 20 is connected permanently or as desired via a communication link 40 to one or more distribution outlets/environments 50. The communication link 40 can be a direct or hard-wired connection, a wireless connection, a network connection or connection over a telecommunications network such as the internet.

An example distribution environment includes a display 52 such as a digital sign visible to an end user 60, a content player 54 and local storage media 56 suitable for storing information on wayfinding content in a manner usable by the content player 54. In certain embodiments, the programming content can be transferred from the programming environment 20 to local storage 56 in a display environment via link 40 automatically or at the instruction of a system manager 30.

While conceptually illustrated as a programming environment 20 and a linked distribution environment 50, system 10 may include various physical allocations of the respective hardware and software. For example, the programming environment 20 and a distribution environment 50 may both be on a single computer, they may be on separate computers or they each may be arranged to include several computers. The programming environment 20 and a distribution environment 50 may be on two computers. Alternately, programming environment 20 may include two or more computers, for example with the programming content on one computer and the programming software on a different computer. The software application interface may be hosted on one computer and remotely accessed by one or more system managers, or the software application and interface may be on individual system manager computers which connect to and communicate with the programming content when desired.

Similarly, the distribution environment 50 may include two or more computers, for example with the display 52 working in conjunction with a content player 56 on one computer and the local storage media 56 on a different computer. Still further, the programming content storage media 22 and the local storage media 56 may be the same storage media. The term "local" storage media is used for purposes of convenient conceptual reference to a local display and is not intended to be limiting. The content for a distribution environment may be remotely located from a physical display location, for example stored on a remote server or using cloud-based storage and the content player 54 may communicate with the storage media via a communications link.

It should be understood that more or fewer computers may be utilized in alternative embodiments. In particular, it shall be appreciated that a large number of computers, such as computers for multiple managers and multiple distribution outlets may be in use within system 10 for performing operations such as allowing numerous individual entities to connect to and use system 10 or supporting multiple displays.

Turning to implementation specifics, in the illustrative embodiment, the computers include one or more processors or CPUs and one or more types of memory. Each memory preferably includes a removable memory device. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA.

Each memory (removable or generic) is one form of a computer-readable storage device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Although not shown, in one embodiment each computer is coupled to a display and/or includes an integrated display. Computers may be of the same type, or a heterogeneous combination of different computing devices. Likewise, displays may be of the same type, or a heterogeneous combination of different visual devices. Although not shown, each computer may also include one or more operator input devices such as a keyboard, touchscreen or mouse to name just a few representative examples. Also, besides a display, one or more other output devices may be included such as a printer. As such, various display, input and output device arrangements are possible.

The various communication links can be in the form of a wireless or wired Local Area Network (LAN), Municipal Area Network (MAN), Wide Area Network (WAN), such as the Internet, a combination of these, or such other network arrangements as would occur to those skilled in the art. In a further form, several computers, such point a programming environment may be coupled together by a secure portion of a network while remaining connected to unsecured portions of a network such as third party electronic communications systems. The operating logic of system 10 can be embodied in signals transmitted over a network, in programming instructions, dedicated hardware, or a combination of these.

In one embodiment, system 10 operates at one or more physical locations where one or more content database servers are configured to store content segments and to send such information to one or more display devices or to allow display devices access to such content. The software computers and/or distribution services allow system managers and end users to interact with and to perform authorized functions within the system, such as to enter information, create/upload content, and/or search and retrieve information. It shall be appreciated that in alternate forms a programming device or distribution outlet may be any web-enabled device, such as a PDA, Blackberry, iPhone, iPad, smart phone or tablet computer, to name just a few illustrative examples.

In broad terms, the system 10 allow a system manager to configure directional "wayfinding" content using the following steps:

1. Select one or more images to serve as a map.
2. Plot locations and paths on the map.
3. Create and assign annotations to the map locations also referred to as points, path nodes and intersections.
4. Specify or allow the system to detect and determine a location indicating an end user's current location on the map.
5. Enable an end user to select a chosen location and to query the wayfinding content for the best route from the end user's current location to this chosen location,
6. Display wayfinding content to the end user using at least textual instructions for the selected route.

These steps are described in detail below.

In initially creating wayfinding content information, the system manager selects one or more map images which will be eventually displayed to the end user. The map preferably corresponds to the geographic area (indoor or outdoor) for which wayfinding content and directions are desired. The map may be a two-dimensional image for an area where wayfinding directions may be provided in two dimensions or alternately may be multiple two dimensional or three dimensional images representing an area or volume where three dimensional wayfinding directions may be provided. Examples of three dimensional volumes represented with multiple two dimensional maps include building or ocean liners with multiple floors. An example of a three dimensional volume would include an area with significant topographic variations in height/altitude. A single two-dimensional map is discussed for simplicity in the description herein, but it not intended to be limited. A personal of ordinary skill in the art will recognize that the described system can be adapted to multi-map and three-dimensional map arrangements.

Figure 2:
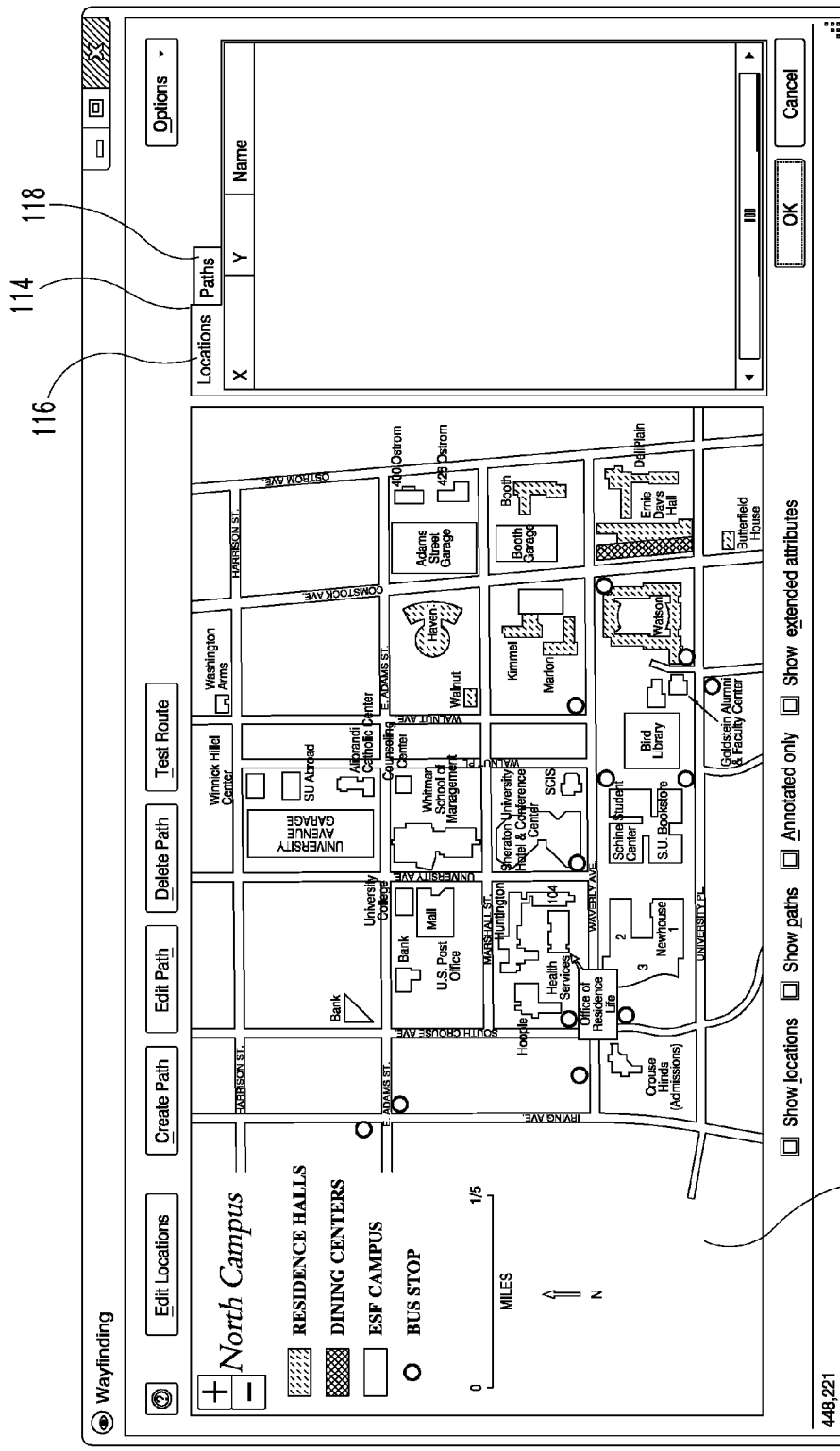
FIG. 2 illustrates an example map image usable in an example embodiment of the system.

The system manager may use the system 10 to select, load and store one or more map images 112 in a suitable format, typically graphical, usable by the system to be displayed to an end user. Selection and loading may be performed by loading one or more map images 112 in a computer readable map file using a standard File Browse dialog interface provided by the operating system. Upon selecting and loading the map file including the image(s), the system displays the map(s). The system also displays an empty list of assets 114, for example separate lists of Locations 116 and Path 118 accessible by selecting corresponding tabs in a sub-window are illustrated in FIG. 2. Optionally, the list of assets 114 may be displayed on a specific portion of the same screen or window showing the map(s) or may be displayed on a separate screen or in a different window. Optionally, the list of assets may be displayed adjacent to the map(s), superimposed on the map(s) or separate from the map(s).

Figure 3:
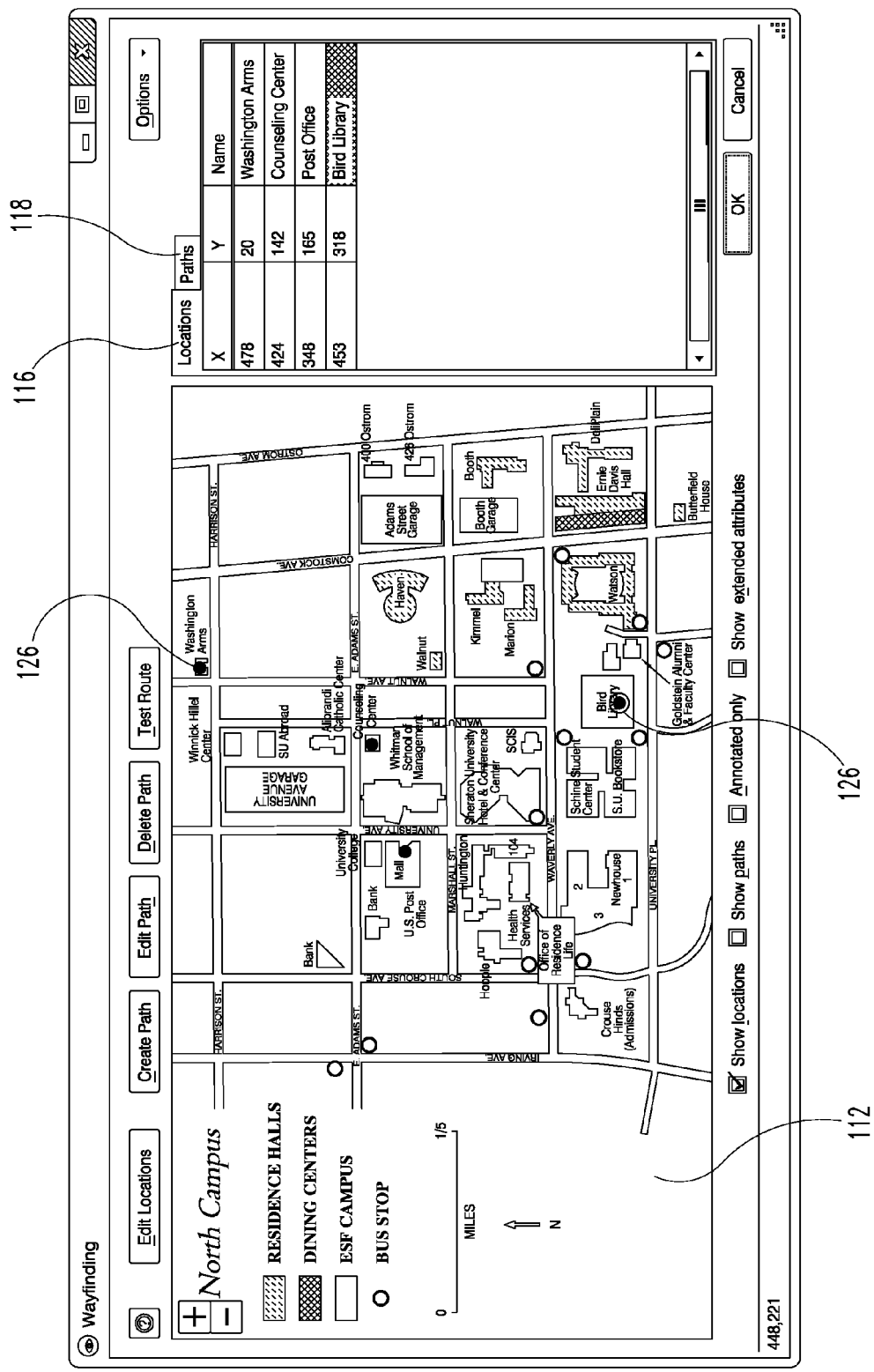
FIG. 3 illustrates example location markings usable in the example embodiment of FIG. 2.

After loading, storing and displaying the desired map images 112, the system manager may use the system to mark specified map locations 126 and paths 128 on the map 112 as illustrated in FIG. 3. The specified locations 126 may be plotted/selected using an input and selection device such as a mouse with a click function, a keyboard or a touch screen. As the user adds locations 126, they are added to the appropriate location list 116 and a corresponding location icon, such as a dot, may be added to map 112. Four locations 126 with map dots and corresponding listings 116 have been added in the example shown FIG. 3. Location icon size, shape and color may optionally be configured by the system manager for all icons or for icons individually.

Figure 4:
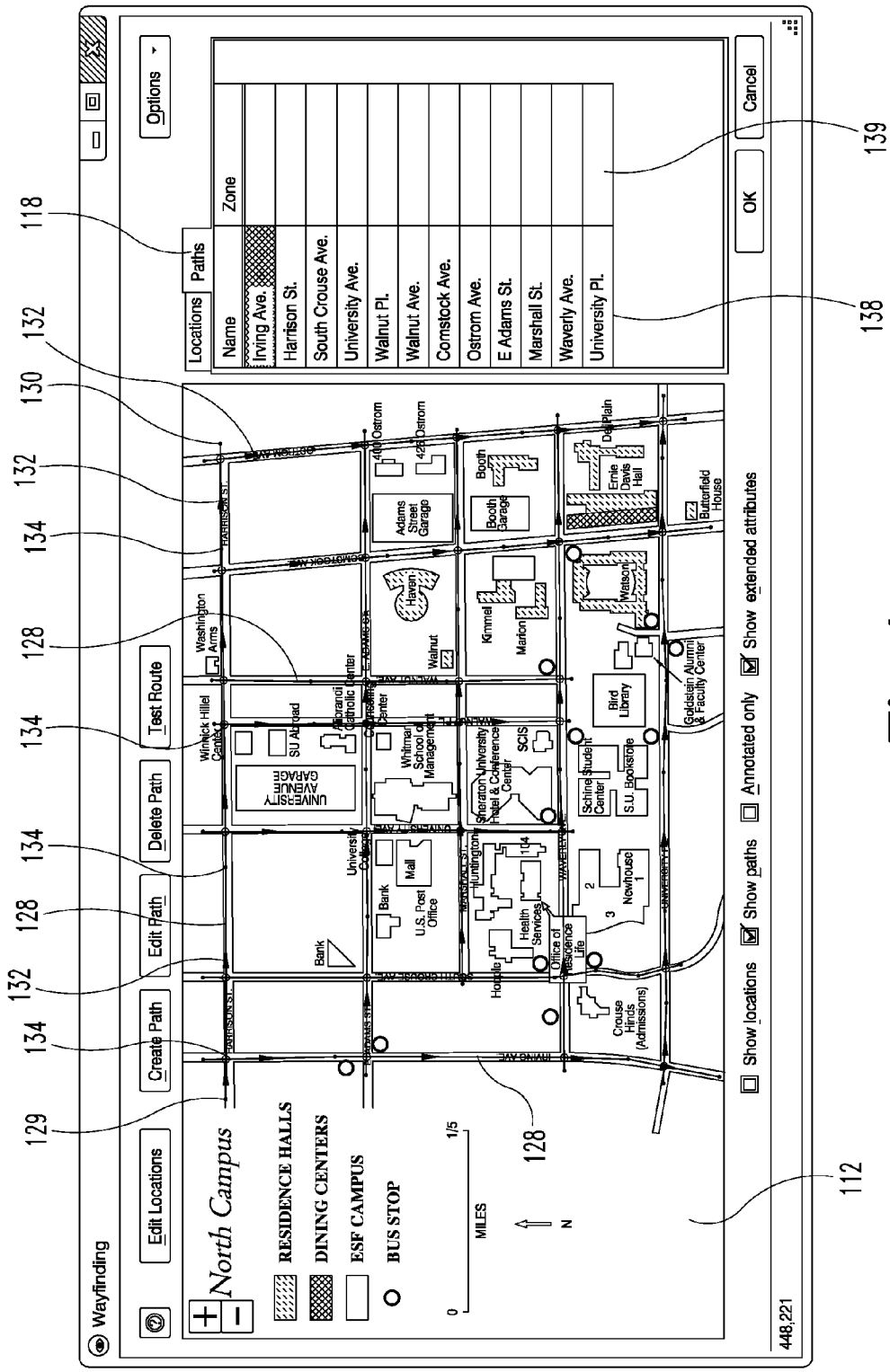
FIG. 4 illustrates example path markings usable in the example embodiment of FIG. 2.

A number of plotted paths are shown in the example shown in FIG. 4. Specified paths 128 may be plotted/designated over map 112 using an input and selection device such as a mouse, a keyboard or a touch screen. A path 128 is typically designated between a start point 129 and an end point 130. A path may be added, for example using a click-and-draw or click technique with a mouse or a touch and drag technique on a touch screen. A path may be added as a line segment between a start point and an end point or may be added as a series of path segments between points or nodes 134, also referred to as map locations. As a path 128 is added, it is displayed as a line on the map and directional indicators, such as directional arrows 132, are associated with the path, typically corresponding to the direction and order in which the path points 134 are entered. Correspondingly an entry for the path appears in the path list 118. The directional indicators may be displayed to the system manager while the system is in a content input or programming mode, yet typically are not visible to an end user during use. The paths or path segments may be named in the "Name" column 138 to match the streets or other routes they represent. Map locations such as start points, end points, specific locations and node points in FIG. 4 are only labeled along one example path for ease of reference.

Preferably the system automatically recognizes points where paths intersect. In alternate embodiments, intersection points may be programmed and designated by the system manager. The "Zone" column 139 illustrated in FIG. 4 may be used to designate one or more zones for one or more maps that have multiple areas with egress and ingress locations. This feature can be used with directional annotations, but is not compulsory.

Once the raw data of locations 126 and path lines 128 have been plotted, the system has the data and basic information it needs to compute a route from one location to another. The system may compute path lengths, path intersections, and proximities of map locations to paths using standard methods of computational geometry.

Embodiments of the present system 10 enable a system manager to use the system to easily provide customizable and changeable textual instructions to users. The instructions may be directional and environment/landmark based such that an end user is directed to take certain paths past or to certain points in a detailed and intuitive manner using an essentially unlimited variety of customizable directions. Such systems may be especially valuable in indoor or outdoor environments where path indicia such as street names have not been assigned or may not be easily known by an end user. The system manager may use the system to program directional aspects of the designed paths at specific points on the paths and map, including but not limited to start and end points, mid-points along paths, at path intersections and specific locations. Preferably the assigned descriptions are useful for navigation, and will be provided to the end user to describe the selected the route when it is computed.

The programmed descriptions, paths and locations are generally not dependent upon the multiple routes that may use them, and are generally available to be used when any of multiple routes may incorporate them. Only annotations from paths and locations that the route "passes through" will be considered and provided to an end user.

Figure 5:
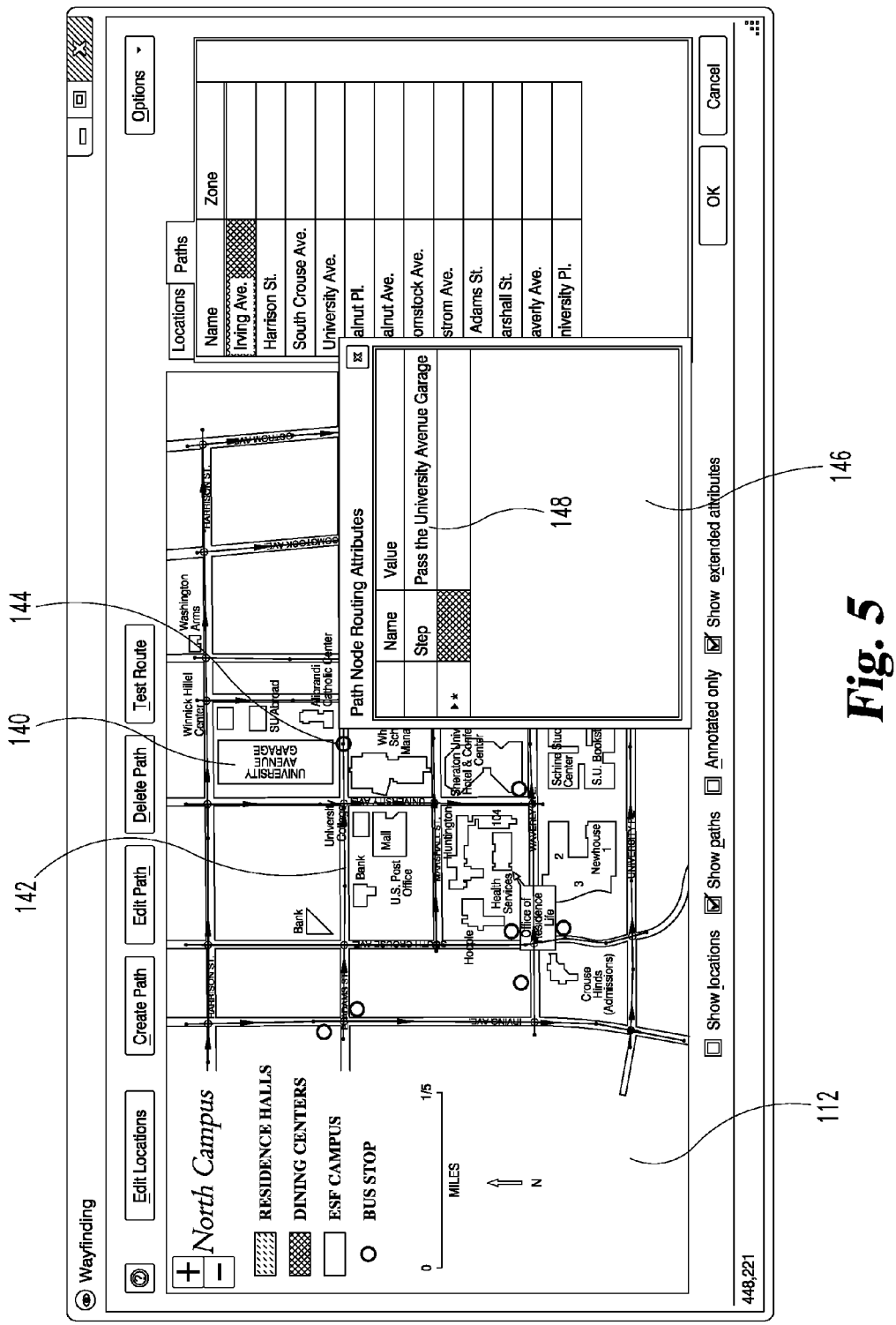
FIG. 5 illustrates an example of path node marking usable in the example embodiment of FIG. 2.
Figure 6:
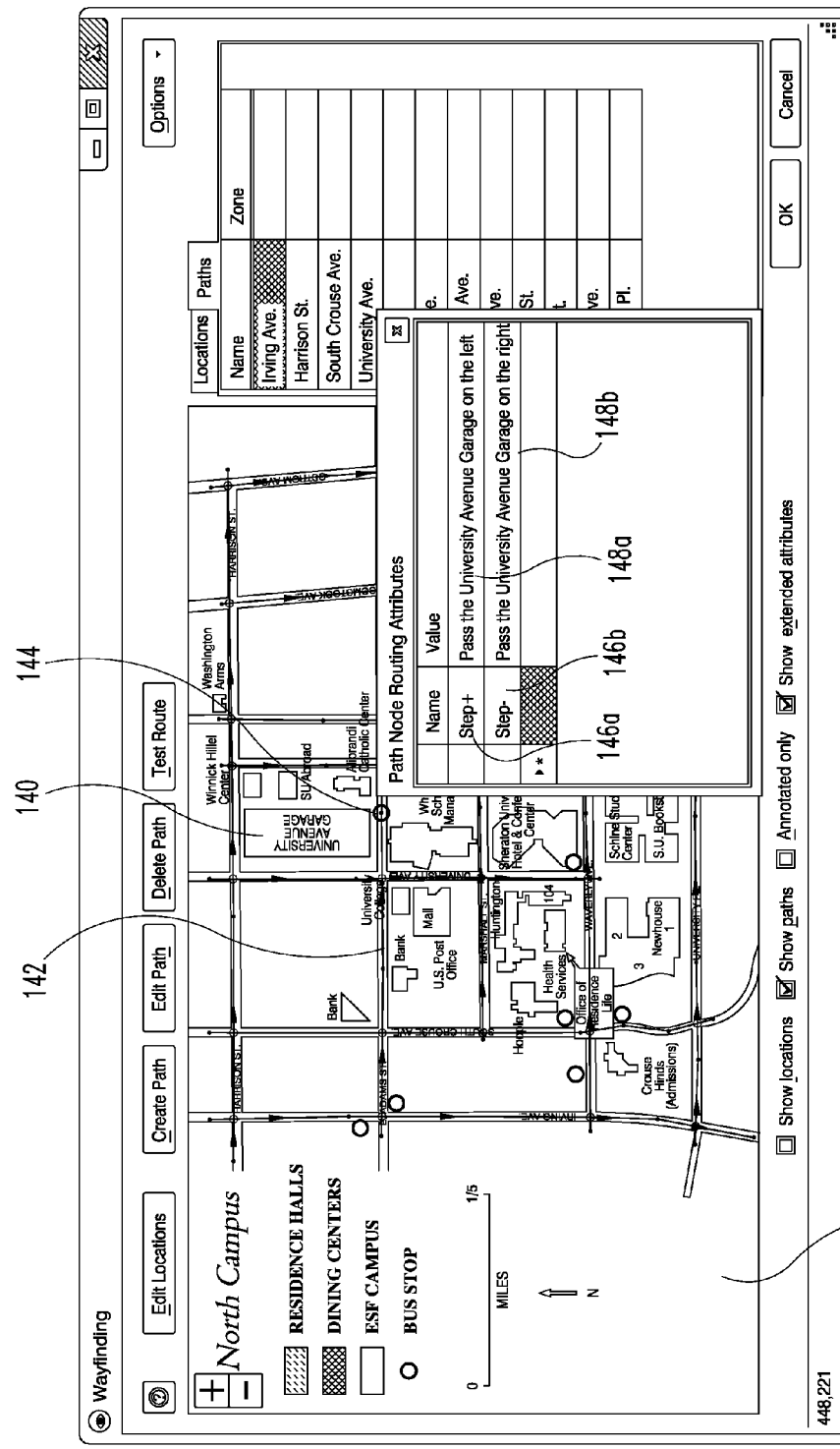
FIG. 6 illustrates a further example of path node marking usable in the example embodiment of FIG. 2.

In the example illustrated in FIG. 5, a useful landmark 140 for navigation is the University Avenue Garage. When passing this location on a path 142 such as E Adams St., it may be helpful to point out landmark 140 in the textual instructions, so that an end user is confident they are following the route correctly. The path 142 near that location can be annotated by selecting a desired spot along the path for example by shift-clicking on a path node 144. In FIG. 5, the selected path node 144 is indicated with a ring. Correspondingly, when a node is selected, a dialogue box 146 is opened for configuring the selected path node attributes.

Optionally, node points can be added as desired.

Textual instructions created by the system manager may be entered into and are displayed in a two-dimensional data set in the dialogue box, where each row of data in the table structure includes text entry fields for programming textual instructions corresponding to an individual directional aspect of an individual path segment. For example, as illustrated in FIG. 5, the table includes a column of "Value" data 148 for each row containing the textual instructions. In this case, when the computed route goes through the selected node, the textual instructions would include a row with one column of data called "Step", whose value 148 would be "Pass the University Avenue Garage."

This instruction can be made more useful by describing which side of the street the landmark 140, i.e. the garage, is from the perspective of the end user. To customize the system, the system manager may specify different Value texts to be displayed to the end user depending on the direction of travel along a particular segment of the path 142. Using the directional aspects of the plotted paths and a directional syntax, the system manager can, for example along a two-way path, designate one instruction for one direction and a second instruction for a second direction. In the illustrated example of E Adams St, the path 142 was plotted left-to-right, so that is its positive direction. The "Name" column can be differentiated between two possible "Step" values 146a and 146b by appending a plus (+) syntax corresponding to a designated forward or positive direction or a minus (−) to indicate the opposite direction to the "Step's" name. Different text values 148a and 148b can be created and assigned corresponding to each direction. In the illustrated embodiment, the "Step+" direction 146a is assigned a value 148a of "Pass the University Avenue Garage on the left" if the end user's route is travelling to the right. If the route is traveling in the opposite direction the "Step-" value 146b is assigned a value 148b of "Pass the University Avenue Garage on the right."

Figure 7:
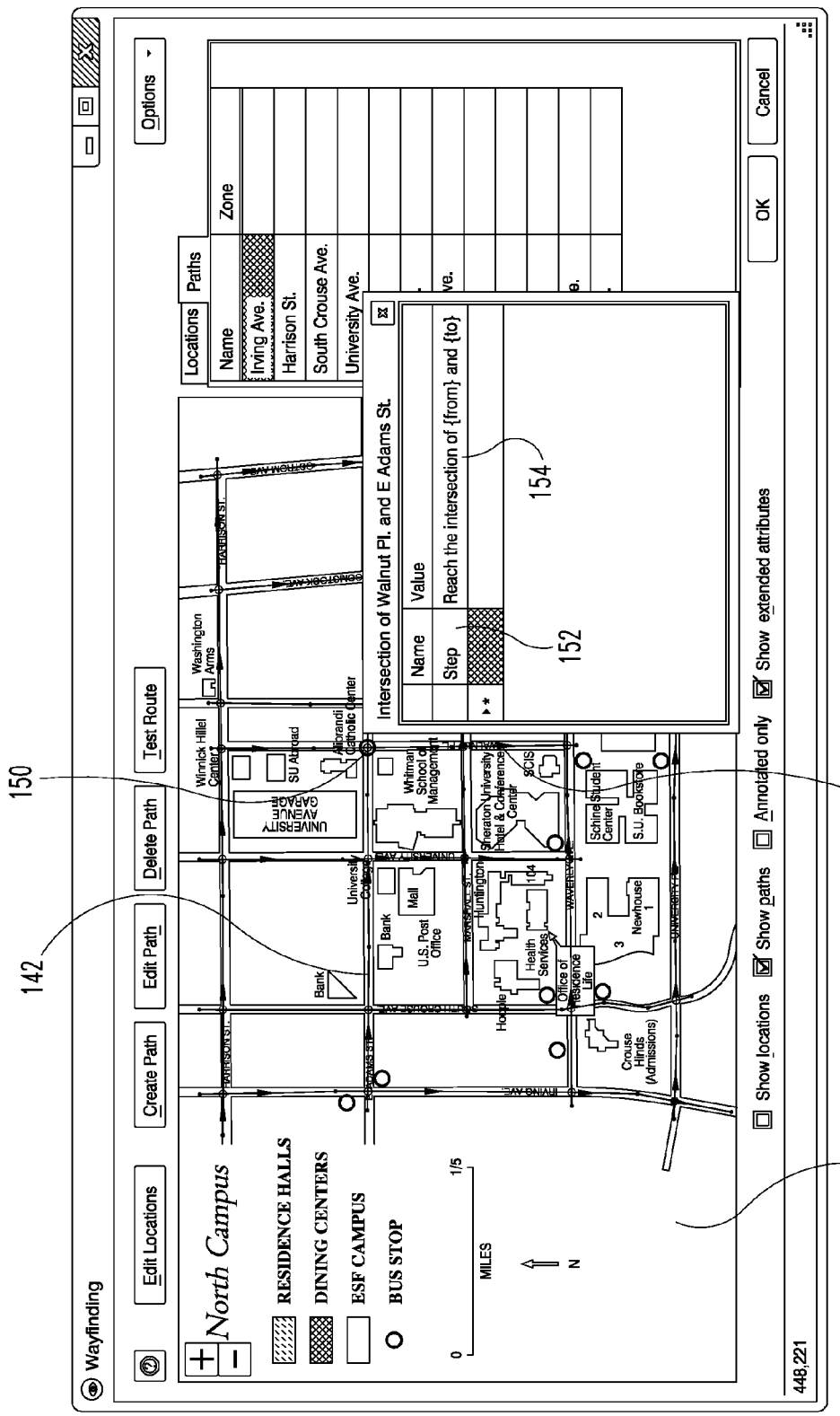
FIG. 7 illustrates an example of intersection marking usable in the example embodiment of FIG. 2.
Figure 8:
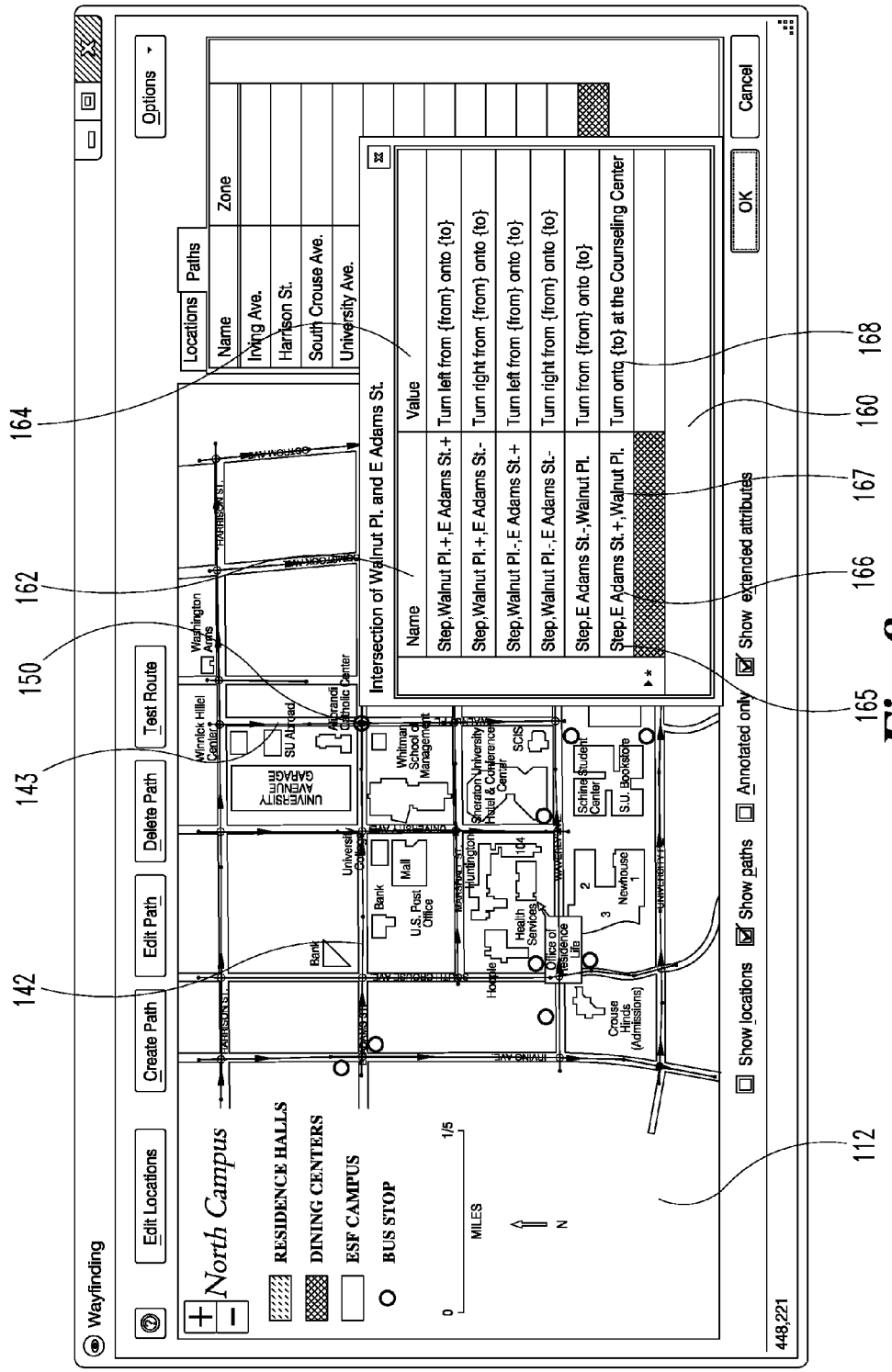
FIG. 8 illustrates a further example of intersection marking usable in the example embodiment of FIG. 2.

Intersections are the most obvious and more complicated points in a route that require instructions for navigation. The present system provides a directional syntax for annotating path intersections which create two or more permutations of directional options. Referring to FIGS. 7-8, details of annotating a two-path intersection 150 of E Adams St. 142 and Walnut Pl. 143 are explained as an example; however, similar methodologies can be used to annotate other intersections or more complicated intersections of three or more paths.

As illustrated in FIG. 7, the system 10 may include an approach instruction as an end user is directed to an intersection 150, for example a Step 152 telling the end user a Value 154 to "Reach the intersection of E Adams St and Walnut Pl." For convenient programming, system 10 optionally yet preferably provides certain pre-programmed variables or field references which can be used to facilitate programming. For example, the built-in fields "{from}" and "{to}" may be used in conjunction with information based on paths entering or leaving an intersections to tell an end user "Reach the intersection" designated by the {from} path which is the path the user is currently approaching upon and the {to} path which intersects the end user's path. In use, the system automatically replaces the fields with the name of the path being traversed before the intersection and the name of the path being traversed after the intersection, respectively.

Embodiments of the present system allow a system manager to program multiple customized directions for a node, such as an intersection, corresponding to the number of available path permutations. Aspects of this programming rely upon direction designated paths and programming using directional syntax, similar to the two directional path annotation discussed above. The tabular programming interface may then be configured as described above to include rows corresponding to all the directions of travel for all path segments ending at a given location thus allowing the system to display directionally based textual instructions for all possible routes through a particular location.

An intersection 150 can be annotated by selecting a desired intersection, for example by shift-clicking on an intersection point or node. In FIG. 8, the selected intersection 150 of E Adams St and Walnut Pl. is indicated with a ring. Correspondingly, a dialogue box 160 is opened for configuring the selected intersection node attributes. The dialogue box includes a two column array of Names 162 and associated Values 164.

In the illustrated embodiment, information in the "Name" portion 162 of the annotation may contains a comma-separated list of three selectively programmed data aspects. The first aspect 165, referred to as a "Step" refers to the name that will be generated in the route data. The second aspect 166 identifies the designated name and direction of the path before the intersection, and the third aspect 167 identifies the designated name and direction of the path after the intersection. Directional aspects 166 of each path use a directional identifier, such as a plus and minus syntax. A corresponding "Value" 168 is assigned by the system manager and contains the textual phrase which will be displayed to the end user when the corresponding Step is invoked.

Using the illustrated example, if the route enters the intersection by traveling along Walnut Pl. 143 in its positive direction (which runs top-to-bottom), and then exits the intersection by traveling along E Adams St. 142 in its positive direction (which runs left-to-right); a "Step" aspect 165 will be programmed and can be invoked to display the value 168 "Turn left from Walnut Pl. onto E Adams St." The "Name" aspect 166 is programmed as "Walnut Pl.+" to refer to the route entering the intersection along Walnut Pl. in its positive direction. The next "Name" aspect 167 is programmed as "E Adams St.+" to refer to the route leaving or exiting the intersection along E Adams St. 142 in its positive direction. Alternate permutations for referring to the direction a route enters the intersection and the designated route to exit the intersection can be programmed by using corresponding permutations of a route name and a plus/minus indicator. A few are illustrated as examples.

Because there are two paths which include two directions each, each entrance path has permutations of three likely potential exit paths, for example corresponding to turn left, turn right or go straight. The action of continuing on the same path can be annotated. For example, "E Adams St," to "E Adams St.-" could be configured to generate the value "Continue on E Adams St." It would also be possible to program a Name 162 and Value 164 for entering from a path and leaving by the same path. This yields four more permutations. For the sake of brevity, all of these permutations are not illustrated.

The "Value" 164 assigned to a particular step may contain a basic text phrase to be displayed using the path names, but preferably may be selectively programmed as desired by the system manager to be intuitive and/or user friendly. Customized Values 164 may include an unlimited variety of textual descriptions which can be easily programmed or re-programmed to fit the details of a particular location. One style of textual description may refer to easily recognizable buildings or landmarks, such as the illustrated example 168 "Turn onto {to} at the Counseling Center." Alternate options include providing easy to follow directions in an area where path names may not be assigned or may not be readily discernable to the end user, for example "turn right at the fountain" or "enter the second door on the right." Helpful comments may optionally be included as well, such as "look for the stairwell on your right" or "if you reach the bridge you have gone too far."

In certain embodiments, the Values 164 may be programmed or reprogrammed to be customized for specific events or temporary locations. For example, a Value 164 could be customized to give directions to turn at an intersection 150 where a referenced landmark is a certain company's booth at a trade show. In certain embodiments, the use of directions which incorporate references to certain specific landmarks or statements may be marketed as revenue generating advertising or sponsorship opportunities.

Figure 9:
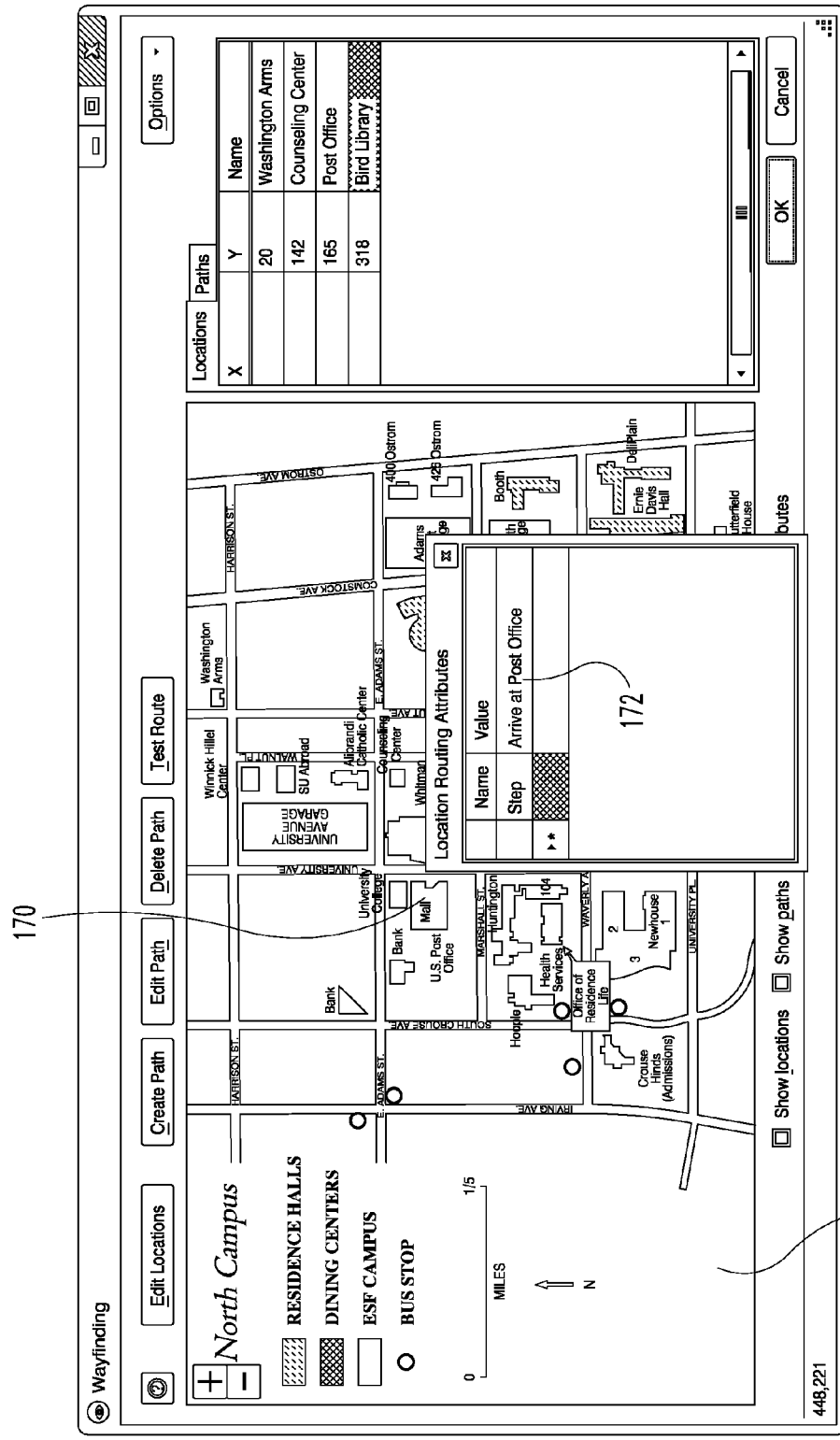
FIG. 9 illustrates an example of location marking usable in the example embodiment of FIG. 2.

The last point reached in a route will often be a specific location 170. It is desirable to annotate the location 170 so that it is included in the instructions, for example with a Value 172 "Arrive at Post Office" as illustrated in FIG. 9. This annotation is generally not directional.

In certain embodiments, the wayfinding content for a designated map 112 can be copied to multiple distribution outlets. Each distribution outlet is programmed with its respective "You Are Here" location so that each distribution outlet then calculates routes using its corresponding "You Are Here" location as a starting point. Alternately, the locations and paths corresponding to map 112 are stored in a shared location, and each distribution outlet queries and retrieves route information as needed while using its corresponding "You Are Here" location as a starting point.

Figure 10:
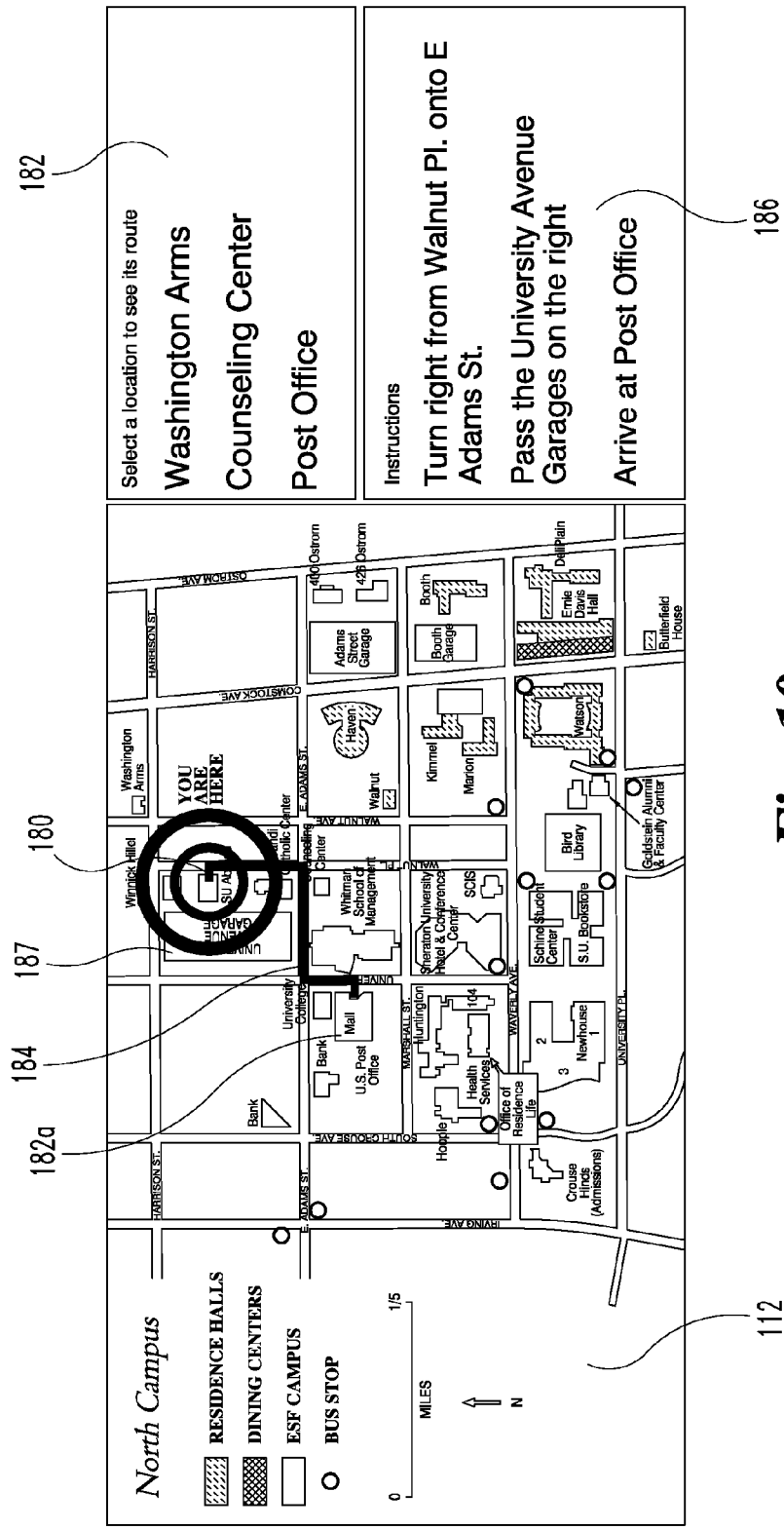
FIG. 10 illustrates an example path displayed to an end user.
Figure 11:
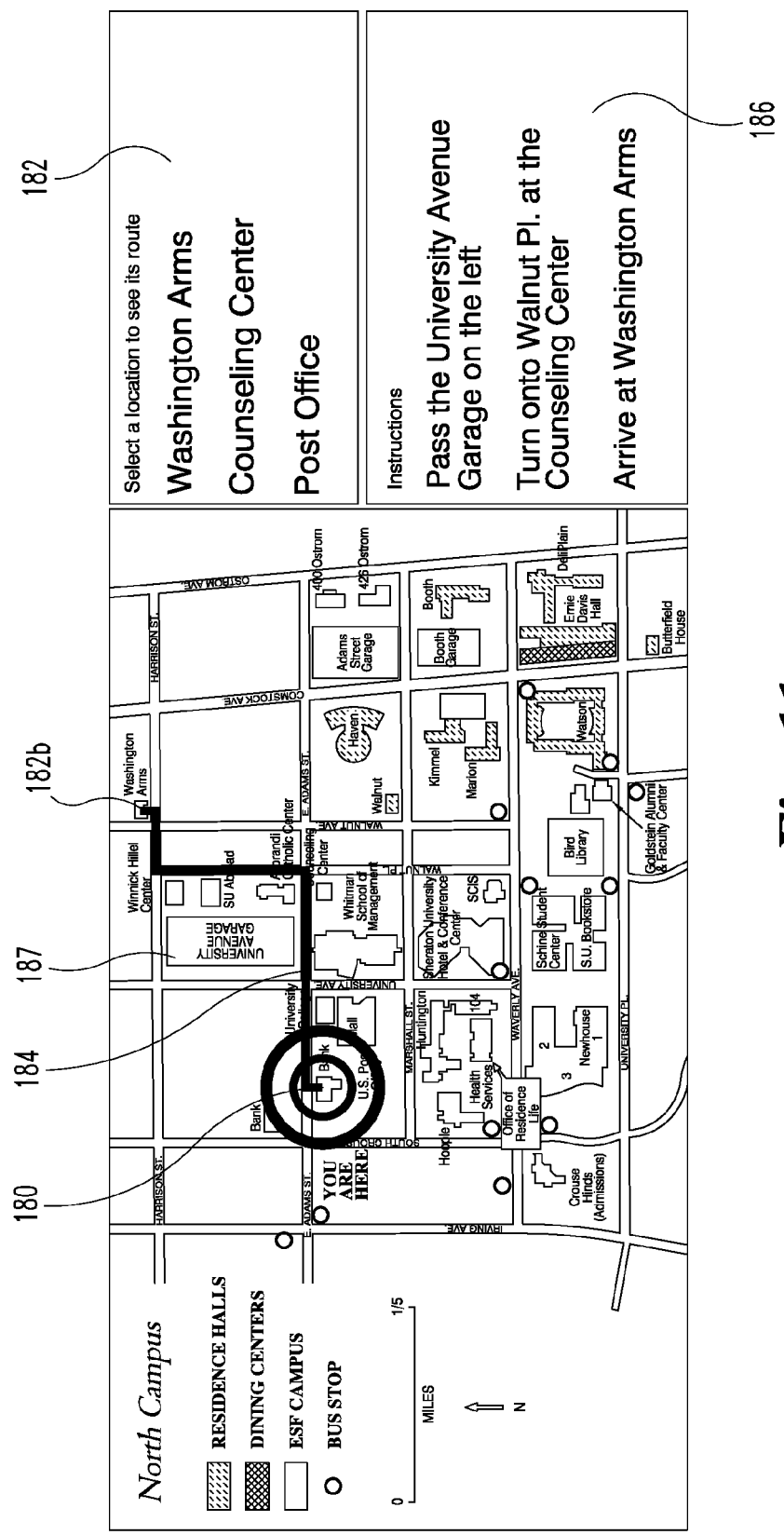
FIG. 11 illustrates an example path displayed to an end user.

In use, the system 10 is intended to be accessed by an end user from a designated distribution location or device such as a digital sign. Alternately, a mobile device can be used and the system may incorporate a location identification function, such as a GPS or signal tracking, proximity sensing or triangulating hardware to determine the device's location. In a further alternate embodiment, the end user can enter the coordinates of the end user's location on the map. The system can then optionally yet preferably provide a "you are here" designation 180, including text and/or an icon, to the end user when the map image is displayed, as illustrated in FIGS. 10-11. The coordinates of the "You Are Here" location are used to facilitate calculating a selected route.

Further in use, the system 10 allows the end user to select a destination such as a preprogrammed location 170 from a list 182 to initiate a query request. The system 10 then computes a suggested route from the current location to the destination using a wayfinding algorithm. Typically, the system calculates the "best" route from one to point to another using a standard graph-search algorithm to solve for the shortest distance route. Alternately, weighting can be used in the algorithm, for example to select the shortest estimated travel time route or to guide a user to use high-traffic or low-traffic paths based on system programmed or end user designated preferences. Optionally, instructions associated with popular routes or route portions may be cached and retrieved as desired to facilitate processing time when that path or path portion is incorporated in a route.

The system 10 then preferably displays map 112 with a route image 184 and/or instructions 186 for navigating that route to the end user. FIG. 10 illustrates an example route 184 from the current location 180 to the Post Office 182a. As illustrated, the directional instruction set 186 includes directions for turning from Walnut Pl. onto E Adams St., and the University Avenue Garage 187 is mentioned as a landmark which is on the right. As a further example, FIG. 11 illustrates an example route 184 from a different current location 180 to the Washington Arms 182b. The displayed instruction set 186 includes directions for turning from E Adams St. to Walnut Pl., and as a landmark the University Avenue Garage 187 is correctly mentioned as being on the left.

In certain embodiments, map image 112, the route image 184 and/or the instructions 186 for navigating that route are visually displayed to the end user and viewed at a particular fixed distribution outlet location, such as a digital sign. In further embodiments, the selected image and/or instructions may be transferred to the end user in a manner that the end user may retain. Examples of methods of transfer include printing a map and/or textual instructions on media such as a piece of paper, allowing for a wired or wireless download of the map and/or instructions to a mobile device or memory device, sending the map and/or text using an email or SMS/text messaging service, or providing a link or link information so that the end user may revisit the displayed image and/or review instructions using another device such as another digital sign or via a mobile device. In the link embodiment, the system may retain the selected route in short-term or permanent memory to be recalled upon demand or may recalculate the route when the selected query request is represented. In certain embodiments, the route or query parameters may be embedded in the information transferred to the end user.

Merely for purposes of illustration and not intending to be limiting, one example of a way the system may store and operate upon the data is using a content type called Live Data. Live Data allows the system manager to specify a URL for the location of the data, and various settings describing the format of the data. It also has a dialog format for laying out the manner in which the data is displayed on a by-row basis, including fonts and screen positions, similar to report-generating software. The map data including the map image, locations, paths, intersections and name/value data can be queried using a pseudo-URL syntax understood by the system. In the illustrated embodiment, the content is called "CampusMap", so the URL to retrieve its location data is content://CampusMap/locations. This will generate an XML document containing the location data. The locations can be queried using the XPath syntax "//Location". When the system shows the content, the locations will be shown as a list in its own area of the display.

The Live Data content may be queried using a URL syntax to compile the textual instructions for a computed route. These annotations can be prepared for display using the XPath syntax "//Feature". For example, to retrieve the instructions for going from the current location to the Post Office, the query URL would be content://CampusMap/features?Name=Post%20Office. The returned data will be an XML document containing the relevant annotations that the route passes through between the current location and "Post Office" including appropriate directional based instructions. When the instructions are displayed, the instructions are preferably displayed in their own area, for example in a specific area of the display or on a secondary display. Alternately, the instructions may be overlaid over an area of the map or individual instructions are overlaid at corresponding specific points on the map.

Figure 12:
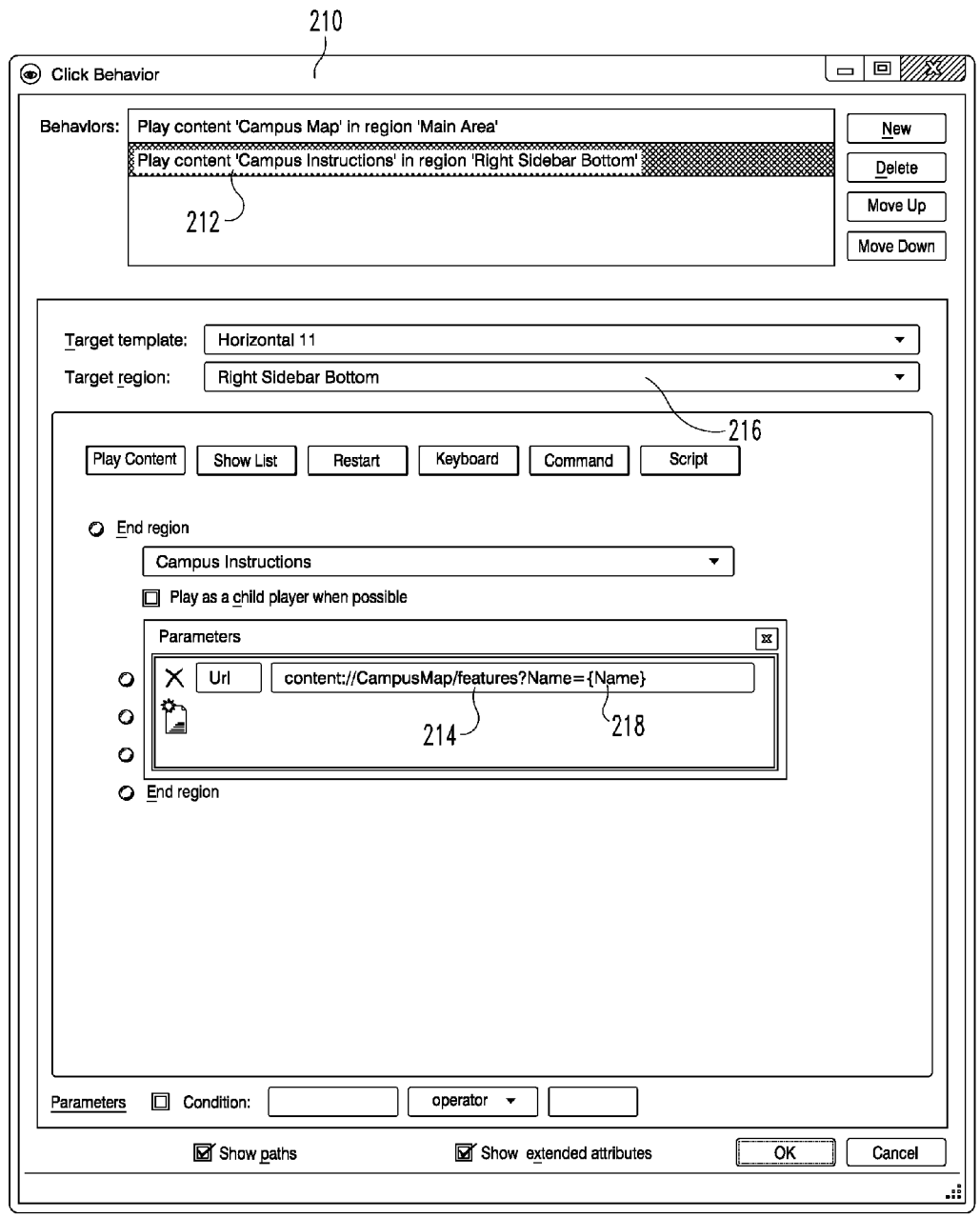
FIG. 12 illustrates a dialogue box for configuring a query and display behavior usable in the example embodiment of FIG. 2.

The Live Data queries and content are configured to respond to end user interactivity, e.g. location selection such as by touches on a touch-screen display to invoke further behavior in the system and on the display. For example an end user may be enabled to select a location name on a list by mouse click, touch or other selection method, and the system then generates and shows the route from the end user's current location to the selected location, along with textual instructions. To accomplish this, the system generates and executes a behavior to generate an image of the map and route, i.e. playing the "CampusMap" in the "MainArea"

region of the display along with drawing the route to the chosen location. Another behavior is to play the "Campus Instructions" in the "Right Sidebar Bottom" region of the display. An example query configuration 210 for the "Campus Instructions" is shown in FIG. 12 where the "Campus Instructions" behavior 212 is programmed with the Parameter 214 "content://CampusMap/features?Name={Name}" which is to be displayed in the region 216 "Right Sidebar Bottom." Upon activation with a {Name} 218 of "Post Office" selected by the end user, the behavior 212 results in textual directions from the current location to the Post Office being displayed in the Right Sidebar Bottom region 216 of the display.

While the illustrated embodiments have been detailed in the drawings and foregoing description, the same is to be considered as illustrative and not restrictive in character, it being understood that only the preferred embodiment has been shown and described and that all changes and modifications that come within the spirit of the invention are desired to be protected. The articles "a", "an", "said" and "the" are not limited to a singular element, and include one or more such elements.

What is claimed is:

1. A method of programming wayfinding content using a wayfinding data content management system having a processor and a database coupled to the processor, comprising:
    accessing a map file having data on one or more map locations and one or more paths between the map locations representing locations and routes on a map, wherein the paths include path segments intersecting map locations, and wherein the path segments have directional aspects defined by directions of travel relative to the map locations and without a limited preprogrammed ruction options explaining the directional aspects;
    displaying a programming interface on a display device having one or more text entry fields corresponding to path segments arranged and configured to allow a system manager to create and enter customized instructional phrases explaining the directional aspects of the path segments, wherein the text entry fields include at least a first text field for entering a first customized instructional phrase explaining traveling along a path segment toward a first map location, and wherein the text entry fields include at least a second text field for entering a second customized instructional phrase explaining traveling in a different direction along the path segment away from the first location;
    receiving the customized instructional phrases programmed by the system manager using the programming interface;
    storing the customized instructional phrases in the database, wherein the customized instructional phrases received by the programming interface are stored with associations linking the customized instructional phrases entered in the text entry fields with the path segment;
    displaying a map on a display for a user;
    allowing a user to select an ending map location;
    calculating a travel route between a starting map location and the user selected ending map location by compiling a sequence of one or more path segments and one or more map locations between the starting and ending map locations;
    retrieving from the database one or more customized instructional phrases for the path segments associated with the compiled sequence of map locations; and
    displaying the customized instructional phrases to the user in an order corresponding to the compiled sequence of map locations.

2. The method of claim 1, wherein the programming interface provides for each map location a number of text entry fields equal to the total number of the directional aspects for the path segments intersecting each location.

3. The method of claim 1, wherein the path segments include other segments with at least one direction of travel toward the first map location, and at least one direction of travel away from the first map location.

4. The method of claim 1, wherein the directional aspects include two directions of travel along a path segment ending at the first map location.

5. The method of claim 4, wherein the programming interface can accept separate textual instructions specific to each direction of travel along the path segment.

6. The method of claim 1, wherein the programming interface includes a table structure having rows corresponding to path segments, the rows including at least a first row in the table that includes the first text entry field for programming the customized instructional phrase corresponding to an individual directional aspect for the path segment ending at the first map location.

7. The method of claim 6, wherein the programming interface includes rows with text entry fields for entering directional aspects of multiple path segments, the multiple path segments having at least one direction of travel toward the first map location, and at least one direction of travel away from the first map location along the respective path segments.

8. The method of claim 7, wherein the table structure includes a number of rows with text entry fields equal to a sum of all the directional aspects for all path segments ending at the given map location.

9. The method of claim 1, wherein the customized instructional phrases are displayed to the user using one of the following devices: PDA, smart phone, or tablet computer.

10. The method of claim 1, wherein the customized instructional phrases are displayed to the user at a fixed distribution outlet location.

11. The method of claim 1, further comprising:
    transferring the customized instructional phrases to the user by one of the following: printing the instructions on media, downloading the instructions to the user's computer using a wired or wireless network, sending the instructions by SMS/text messaging service to the user, or providing a link for allowing users to revisit the instructions.

12. A method of programming wayfinding content using a wayfinding data content management system that includes a programming environment, and one or more distribution environments having displays, comprising:
    accessing a map file having data on one or more map locations and one or more paths between the map locations representing locations and routes on a map, wherein the paths include path segments intersecting map locations, and wherein the path segments have directional aspects defined by directions of travel relative to the map locations and without a limited preprogrammed ruction options explaining the directional aspects;
    providing a programming interface having text entry fields for each path segment arranged and configured to allow a system manager to compose and enter customized instructional phrases explaining the directional aspects of the path segments, wherein the text entry fields for a respective path segment include at least a first text field for a entering a customized instructional phrase explaining traveling along a path segment toward a first map location, and wherein the text entry fields include at least a second text field for entering a customized instructional phrase explaining traveling in a different direction along the path segment away from the first location;

displaying the map to users using a display at the one or more distribution environments;

allowing a user at a distribution environment to select an ending map location;

calculating a travel route between a starting map location at the respective distribution environment and the selected ending map location by compiling a sequence of one or more path segments and one or more map locations between the starting and ending map locations;

retrieving one or more customized instructional phrases corresponding to the directional aspects of the path segments included in the compiled sequence of map locations; and displaying the customized instructional phrases to the user in an order corresponding to the compiled sequence of map locations using the display.

13. The method of claim 12, further comprising:

storing the customized instructional phrase in a database coupled to the programming environment; and transferring the customized instructional phrase to the one or more distribution environments.

14. The method of claim 12, wherein the programming interface allows the system manager to reprogram the customized instructional phrase using the programming interface when one or more map locations changes.

15. A method of programming wayfinding content using a wayfinding data content management system having a processor and a database coupled to the processor, comprising:

accessing a map file having data on one or more map locations and one or more paths between the map locations representing locations and routes on a map, wherein the paths include path segments intersecting map locations, and wherein the path segments have directional aspects defined by directions of travel relative to the map locations and without a limited preprogrammed set of instruction options explaining the directional aspects;

displaying a programming interface on a first display device having text entry fields for each path segment arranged and configured to allow a system manager to create and enter customized instructional phrases explaining the directional aspects of the path segments, wherein the text entry fields for each path segment include separate text fields for entering customized instructional phrases explaining each direction of travel along the corresponding path segment;

storing the customized instructional phrases programmed using the user interface in the database, wherein the customized instructional phrases are stored with associations linking the customized instructional phrases entered in the separate text fields with the corresponding path segment;

displaying a map on a second display device for a user;

allowing a user to select the first map location as an ending map location;

calculating a travel route between a starting map location and the user selected ending map location by compiling a path including a sequence of one or more path segments between the starting and ending map locations;

retrieving from the database one or more customized instructional phrases associated with the one or more path segments between the starting and ending map locations; and displaying the customized instructional phrases to the user in an order corresponding to the compiled sequence of path segments.

16. The method of claim 15, wherein the programming interface includes a table structure for programming the directional aspects for a given map location, the table having rows corresponding to the directional aspects of the path segments, the table rows including separate rows for the text fields for programming the customized instructional phrases corresponding to the individual directional aspects of the path segments.

17. The method of claim 16, wherein the table structure includes rows equal to a sum of all the directional aspects for all path segments ending at the first map location.

18. The method of claim 15, wherein the programming interface provides text entry fields for each path segment, wherein the total number of text entry fields is equal to the sum of the directional aspects of the path segments in the sequence of one or more path segments.

19. The method of claim 18, wherein the programming interface can accept separate customized instructional phrases specific to each direction of travel along the path segments.

* * * * *

UNITED STATES PATENT AND TRADEMARK OFFICE
CERTIFICATE OF CORRECTION

| | |
|---|---|
| PATENT NO. | : 9,037,402 B2 |
| APPLICATION NO. | : 13/948451 |
| DATED | : May 19, 2015 |
| INVENTOR(S) | : David Shapiro Simring |

It is certified that error appears in the above-identified patent and that said Letters Patent is hereby corrected as shown below:

In the Claims

Col. 11, line 34, Claim 1, change "ruction options" to --set of instruction options--.

Col. 12, line 61, Claim 12, change "ruction options" to --set of instruction options--.

Signed and Sealed this
Eighth Day of September, 2015

Michelle K. Lee
*Director of the United States Patent and Trademark Office*